United States Patent [19]

Weinstein

[11] 4,093,460

[45] June 6, 1978

[54] CONTRAST ENHANCEMENT AND SMALL DETAIL BLENDING OF PHOTOGRAPHIC IMAGES

[76] Inventor: Leonard M. Weinstein, 13 Burke Ave., Newport News, Va. 23601

[21] Appl. No.: 677,644

[22] Filed: Apr. 15, 1976

Related U.S. Application Data

[63] Continuation-in-part of Ser. No. 395,494, Sep. 10, 1973, abandoned.

[51] Int. Cl.² ............................................. G03C 5/04
[52] U.S. Cl. ...................................... 96/27 E; 96/44; 350/314
[58] Field of Search ...................... 96/5, 27 E, 44, 45; 350/314

[56] References Cited

U.S. PATENT DOCUMENTS

| | | | |
|---|---|---|---|
| 1,990,396 | 2/1935 | Ballard | 96/27 E |
| 2,363,689 | 11/1944 | Rackett | 96/5 |
| 2,755,402 | 7/1956 | Morrell | 313/408 |
| 3,253,918 | 5/1966 | Condax | 96/5 |
| 3,411,905 | 11/1968 | Mooney et al. | 96/5 |
| 3,615,433 | 10/1971 | Biernson | 96/44 |
| 3,817,748 | 6/1974 | Whittaker | 96/1 R |
| 3,834,905 | 9/1974 | Dodd et al. | 96/27 E |

*Primary Examiner*—Roland E. Martin, Jr.
*Attorney, Agent, or Firm*—Howard J. Osborn; John R. Manning; Wallace J. Nelson

[57] ABSTRACT

A method and apparatus for improving the quality of photographic images by projection through a linear radial transmission filter. The invention yields small detail blending or contrast enhancement of small details with a minimum loss of sharpness. A simple enlarger and a linear radial transmission filter are used to process a wide variety of images and are capable of simple adjustment to vary the resulting degree of blending or enhancement.

6 Claims, 3 Drawing Figures

CONTRAST ENHANCEMENT AND SMALL DETAIL BLENDING OF PHOTOGRAPHIC IMAGES

ORIGIN OF THE INVENTION

The invention described herein was made by an employee of the United States Government and may be manufactured and used by or for the Government for governmental purposes without the payment of any royalties thereon or therefor.

This application is a continuation-in-part of application Ser. No. 395,494 filed Sept. 10, 1973, now abandoned.

BACKGROUND OF THE INVENTION

This invention relates generally to photographic printing and specifically to a method and apparatus for the improving of print quality by blending or enhancement of small detail.

Photographic negatives frequently contain two problems which give rise to unsatisfactory appearance and difficulty in information retrieval from the final photographic print. One problem, graininess, is typified by the granular appearance of a print caused by enlargement to such a scale that the elements composing the gray background of the picture show up as distinct areas. This problem also appears in photographs of television pictures, caused by the horizontal scan lines of the television picture and in the halftone dots in newspaper photographs.

The second problem, lost detail, is one caused by the limited dynamic range of normal photographs in regard to contrast. This is apparent when high contrast between large areas of a photograph masks small detail which actually exists on the negative. This detail is not retrievable by normal printing methods because such printing methods result in very low local contrast in the extremely light and extremely dark areas. While methods exist to overcome these problems, all suffer from either the compromising of picture quality or from the need for complex and expensive equipment.

For instance, graininess may be removed by simple defocussing but excessive small detail is thereby lost. Also a conventional unsharp mask technique without a linear transmission filter may be used to reduce large scale contrast while retaining small detail, but this method gives up some exposure control accuracy and cannot blend small detail. Spatial filtering techniques may be used to accomplish both goals, to enhance or to blend details in prints, but they require highly accurate and expensive equipment and are complex to use. Spatial filters also limit the size negative which can be used and limit the overall image quality available.

The present invention makes available a simple, low cost method for both blending small detail and enhancing the contrast of details otherwise lost because of high contrast areas on the photograph.

SUMMARY OF THE INVENTION

The present invention uses an average quality projection system along with a linear radial transmission filter to project an image of a negative for printing. A typical arrangement can use a standard enlarger set-up. The linear radial transmission filter is an optical quality filter which has maximum transmission in the center, and whose transmission decreases toward zero at the outer edge in a linear function.

When a linear radial transmission filter is placed in front of the enlarger lens the focused image is not affected (except for a drop in overall exposure intensity), but the out-of-focus image will change considerably. The out-of-focus image of each point of the negative projected through the linear radial transmission filter becomes a small image of the filter whose diameter depends only on the degree of defocusing. The brightness across any diameter of the out-of-focus spot varies exactly as an isosceles triangle.

Mathematically, the addition of the heights of equal isosceles triangles whose base sizes equal twice the spacing between their peaks results in a single plateau with a height equal to the peak of the triangles and with the end slope identical to the sides of one of the triangles.

In the same manner, the out-of-focus image will exactly blend equal intensity spots whose centers are spaced at distances equal to the spot radii into a larger area of continuous brightness. While the spots resulting from graininess in the typical photographic print are not, in general, equally spaced or equally bright so that no one setting exists which can perfectly blend all the spots, the goal is to arrive at evenly shaded areas in which the individual picture elements are least discernible. This goal is achieved by projecting and then adjusting the image to that setting which yields a smooth and even shading between the individual picture elements.

In one typical arrangement, with the linear radial transmission filter directly in front of an enlarger lens, the adjustment of spot size is accomplished by simply varying the distance at which the print paper is placed from the point of sharp focus. Thus, greater blending of graininess and small detail is accomplished by moving the paper further from the in-focus point until the setting which most closely approximates the situation illustrated in FIG. 2 is achieved. This setting is determined by visual observation of two adjacent picture elements and is discussed in detail below. The above described technique permits the production of photographic prints or transparencies in which grain structure is blended but where there is very little sacrifice of sharpness.

The same essential technique, with the addition of one step, can yield a print in which large scale contrast is muted to better bring out the contrast of smaller details. This process, small detail enhancement, is accomplished using the technique noted above to produce a positive transparency as previously mentioned. This positive transparency is made so that small detail, up to the size for which enhancement is desired, is blended during its production. The transparency is then used as a mask over the original negative during a second projection operation without the linear radial transmission filter for the making of the final print. In this operation, since the positive transparency and the negative are the same size, details which have not been blended in the positive transparency exactly counteract the same details in the negative. However, small details which have been blended in the positive transparency are only projected with generally lower intensity. A resulting print therefore has much lower contrast between all large areas, that is, the large dark areas are printed much less darkly, while the small details are shown with only slightly less contrast than originally. It requires only the use of higher contrast paper to result in increased contrast for the small details and approximately the original contrast in the large areas.

Small detail enhancement therefore results. Appropriate use of varying contrast positive transparencies and varying contrast paper for the final print can yield a wide variation in enhancement of small detail or suppression of large high contrast areas depending upon results desired.

DETAILED DESCRIPTION OF THE INVENTION

Structure of the Preferred Embodiment

Figure 1:
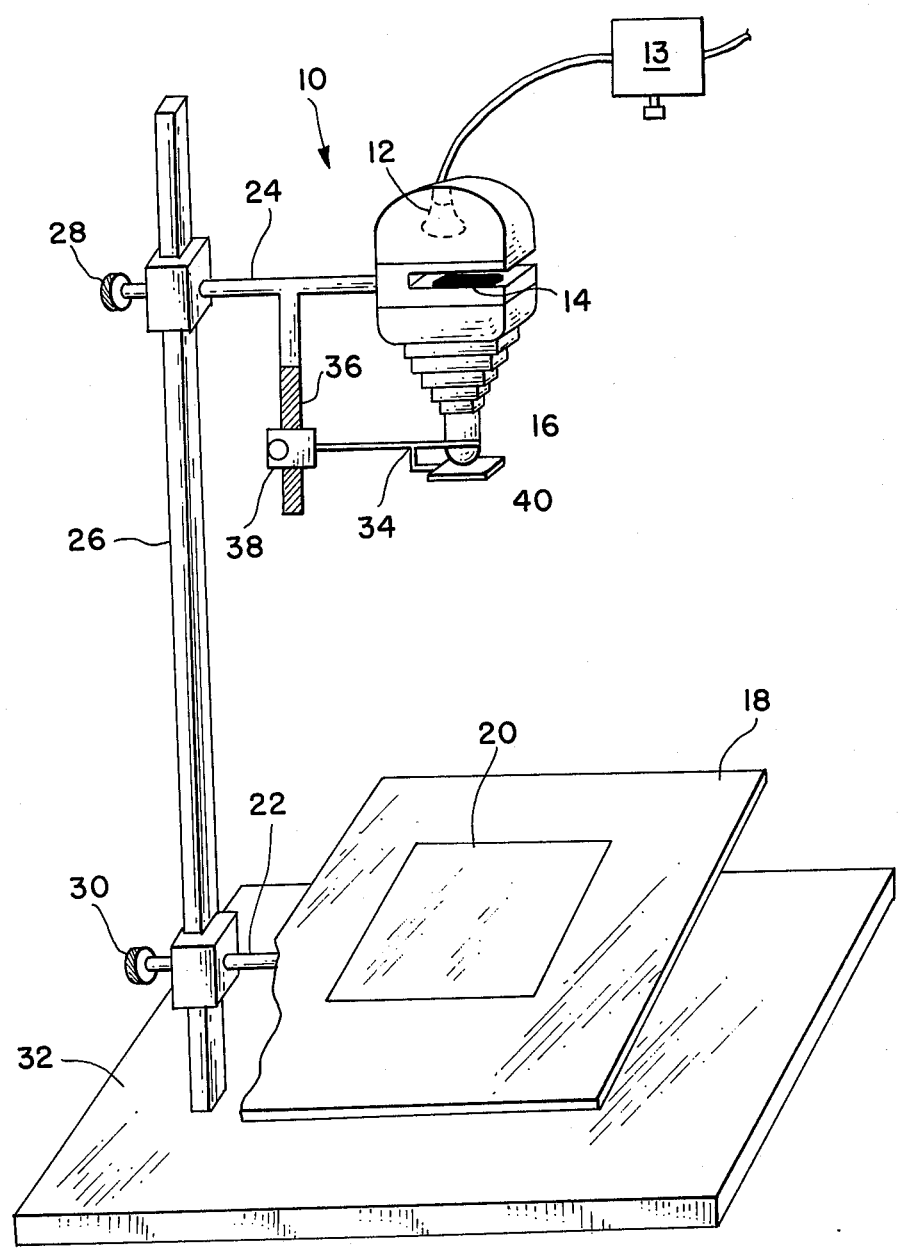
FIG. 1 is a perspective view of the preferred embodiment of the invention.

The preferred embodiment selected for illustration is similar to a conventional photographic enlarger and is shown in FIG. 1. The apparatus shown includes an optical projector 10 within which is a light source 12 controlled by light control 13. The light source illuminates an image source 14 such as a conventional photographic negative. The image created by the light source 12 and the image source 14 is projected through lens 16 onto projection surface 18 or onto any surface covering the projection surface such as the photographic paper 20. The optical projector 10 and projection surface 18 are maintained in rigid alinement regardless of their separation by upper holder 24 slidably attached to alinement rod 26 by clamp 28 and by lower holder 22 similarly attached by clamp 30. The entire structure is maintained in a vertical orientation for convenient access by base 32 to which alinement rod 26 is conventionally attached. Lens 16 of optical projector 10 is maintained in linear alinement with light source 12, image source 14 and projection surface 18 by holder 34, which is attached to threaded extension 36 by drive mechanism 38. Threaded extension 36 is, in turn, rigidly attached to upper holder 24. Holder 34 also rigidly attaches linear radial transmission filter 40 to optical projector 10 so that linear radial transmission filter 40 is held in close proximity to lens 16 and intercepts the projected image. The filter 40 may alternatively be placed in contact with lens 16.

The linear radial transmission filter 40 is a device whose light transmission characteristics vary linearly with the distance of any particular point from the center of the filter. The light transmission of the filter is maximum at the exact center of the filter and no light is transmitted through the filter at its outer edge. The variation of transmission characteristic between the center and edges vary directly as the distance from the center. Thus the filter, generally constructed as a circle, has a transmission characteristic linearly decreasing with the distance from the center. The effect is that the measurement of light transmission of such a filter taken across any diameter begins with no transmission at one end, rises linearly to a peak at the center and then falls linearly to no transmission at the other end of the diameter. The graph of such a characteristic is best represented by a simple isosceles triangle.

OPERATION OF THE PREFERRED EMBODIMENT

The operation of the preferred embodiment shown in FIG. 1 is particularly dependent on the above-described characteristics of linear radial transmission filter 40. When the focus of optical projection 10 upon projection surface 18 is adjusted by sliding either upper arm 24 or lower arm 22 upon alinement rod 26 or adjusting drive mechanism 38 such that the projected image upon projection surface 18 is sharply in focus, linear radial transmission filter 40 has no effect upon the image. But when the apparatus is adjusted off the sharp focus point, for instance, by moving projection surface 18 closer to optical projector 10, each spot of light from which the image is composed is modified in such a way as to blend small detail or eliminate graininess.

Because the image is transmitted through linear radial transmission filter 40, each of these light spots or picture elements themselves take on the characteristic pattern of the filter. Thus the defocused light spots each appear as a spot varying linearly in intensity across any diameter and peaking in the center of the spot. The spot characteristic, like the filter characteristic can be represented by an isosceles triangle.

Figure 2:
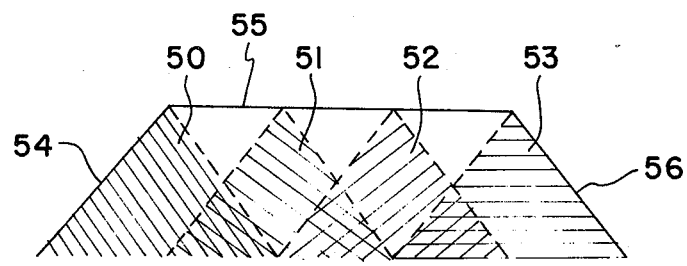
FIG. 2 is a graphical representation of the addition of isosceles triangles.

The mathematical property of a series of isosceles triangles is that they can be overlapped and their heights added so that they form a perfect plateau with sides equal to the sides of the end triangles of the series. This result can be accomplished when the triangles are oriented with a peak-to-peak spacing of exactly one half their base length. This situation is illustrated in FIG. 2 where isosceles triangles 50, 51, 52, and 53 are added to form plateau with sides 54 and 56 and top 55. The same effect occurs when the light intensity of equally spaced picture elements is filtered through a linear radial transmission filter and the defocusing of the image is adjusted to expand each picture element to a size such that the edge of each picture element just reaches the centers of adjacent picture elements. The result at this defocus point is a large area of even intensity of light where previously there existed a multiplicity of individual picture elements. While the situation described above of equally sized elements exactly equally spaced does not exist in any actual physical case, the perfect case can be approached closely enough so that the average picture element size and spacing yields a very satisfactory blending of graininess or other small detail.

To accomplish the blending of graininess in the preferred embodiment, an image source 14, usually a photographic negative, is projected onto projection surface 18 through linear radial transmission filter 40 by optical projector 10. By sliding either upper holder 24 or lower holder 22 along alinement rod 26 and adjustment of drive mechanism 38 the desired size of image is secured and the image is sharply focused. The image is then defocused to a point where the desired degree of blending of small detail or graininess is attained by further adjustment of drive mechanism 38, upper holder 24, or lower holder 22. This desired degree of blending is attained by observing two adjacent typical picture elements and defocusing to that point where those elements of the picture, the "grains" of a typical photographic projection, are seen to blend into the adjacent elements. The defocusing is continued until the blending is complete as indicated by no substantial difference in shading between the points where the previous spots existed. At this point the situation illustrated in FIG. 2 is approximated. Should the defocusing progress too far, a picture spot will begin to form midway between the previous focused spot, and the adjustment must be backed off. When the desired setting is reached photographic paper 20 is placed upon projection surface 18 and conventional exposure is accomplished by optical projector 10 through linear radial transmission filter 40. This is followed by conventional processing to yield a print or transparency with graininess and small detail blended.

The second objective of the invention, enhancement of small detail, can be accomplished by a continuation of the above described operation. For this result a positive transparency mask is produced by the method described above. This transparency is made either the exact size of the print ultimately required or of the original negative. The choice of either size is largely influenced by the factors such as size of the negative, capability of the optical projector for projecting an image the same size as the negative and the number of prints to be ultimately produced. For a high quantity of prints, for instance, it is easier to make the mask the size of the negative because it requires the alinement of negative and mask only once.

When the positive transparency mask is produced as discussed above, the small details for which enhancement is desired in the final print are completely blended during the production of the positive transparency. It is this action which creates the opposite result in the final print. Once the positive transparency is processed it is used during a second projection operation to mute contrast of the final print by preventing the projection of large areas of light which later become dark, high-contrast areas.

This problem and the method can best be understood by the attempt to print a large black square with several small gray dots close together within it. Typically this is difficult to accomplish because the high exposure of the black square and the limited print paper exposure range "washes out" the presence of the gray dots. To overcome this, the positive transparency mask is produced after blending together the several dots as described by the method above. This yields a positive transparency mask with essentially one object, a large dark square slightly lighter in the area of the previous dots. If the mask was produced in the appropriate size it is taped to the previous negative so that the dark square on the mask exactly overlaps the light square of the negative. The darkness of the square is determined by the contrast of the film used to create the transparency and will itself determine the degree of enhancement in the final print. When this combination of mask and negative is now projected for a printing operation, this time with the linear radial filter removed from the projection system and the system in sharp focus, the squares on the negative and the mask essentially counteract each other and project only dimly. The original dark dots on the negative, however, are not counteracted by the mask since no dots exist on the mask. These dots therefore project less light than the rest of the square and show up as spots with greater contrast on the final print. The degree of enhancement of such features as the spots may be controlled by the use of varying contrast paper in the final print as well as the contrast of the film used for the mask. The mask may also be laid directly upon the final print paper, where a sharp image is produced, and, if alined with the projected image, will accomplish the same result as when attached to the negative. To aid in the alinement of the mask with either the negative or the projected image, it is desirable to use several holes on the negative placed outside the area of interest on the final print. These holes may also be used during the production of a mask of the same size as the negative by using the measurements between them on the negative to check the image size before exposure.

Figure 3:
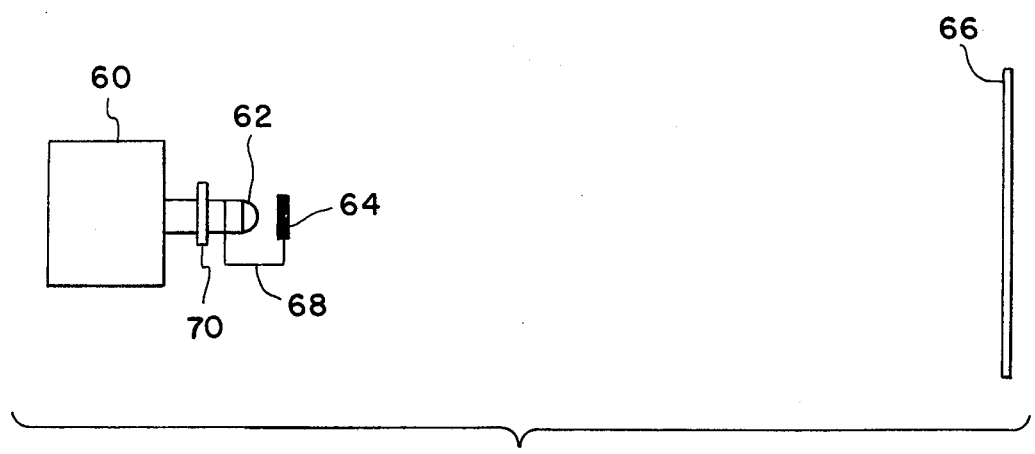
FIG. 3 is a schematic representation of an alternate embodiment of the invention.

Another embodiment of the invention is pictured schematically in FIG. 3. In this embodiment the linear radial transmission filter may be used in conjunction with an immediate-viewing projection system to blend undesired picture elements. In a television projection system, for example, the horizontal scan lines become more and more objectionable as the image is enlarged. As shown in FIG. 3, linear radial transmission filter 64 is attached to projector 60 in close proximity to lens 62 by holder 68. The image is then projected upon projection screen 66 and the projection system focus adjusted by adjustment 70 until the picture elements are blended for satisfactory viewing.

It is to be understood that the forms of the invention herein shown are merely preferred embodiments. Various changes may be made in the shape, size or arrangements of parts; equivalent means may be substituted for those illustrated and described and certain features may be used independently from other features without departing from the spirit and scope of the invention. For example, the linear radial transmission filter may be placed on the side of the lens nearest the light source rather than as shown on the side nearest the projection surface. In addition, the linear radial transmission filter may be located internal to the lens at the lens stop. Moreover, in FIG. 1 base 32 may be substituted for projection surface 18 by the simple removal of projection surface 18. And relating to FIG. 3, the projector may be one used for motion pictures as well as one used for projecting television images.

What is claimed as new and desired to be secured by Letters Patent of the United States is:

1. A method of blending the granular appearance and small details of a projected image which comprises the steps of:
   providing a projection system including a light source, a lens, and an image source;
   inserting a linear radial transmission filter immediately adjacent to said lens whereby said projection system projects an image through said linear radial transmission filter;
   placing a projection surface at the sharp focus position of the projection system whereby an image is secured;
   moving said projection surface away from said sharp focus position thereby causing the granular structure and small detail of said image to be blended such that individual portions of the granular structure are not distinguishable from each other.

2. A method for blending the granular appearance and small details of a projected image as in claim 1 including the further steps of substituting photographic print paper for the projection surface and exposing the photographic print paper to produce a print wherein the grain structure and the small details of the image source do not appear on the photographic print.

3. A method for contrast enhancement of small details on a photographic negative which comprise:
   providing a projection system with light source and lens for the negative;

inserting a linear radial transmission filter immediately adjacent to said lens whereby the projection system projects an image of the negative through said linear radial transmission filter onto a projection surface at the sharp focus point of said projection system;

moving said projection surface along the axis of projection away from said sharp focus position to that position at which the images on the photographic negative desired to be enhanced on a final photographic print are blended into their surroundings and are not discernible;

substituting positive transparency means for said projection surface;

exposing said positive transparency means;

processing said positive transparency means into a positive transparency mask;

moving said projection surface back to the point of sharp focus;

removing said linear radial transmission filter from said projection system;

projecting a second image of the negative through the positive transparency mask onto the projection surface;

substituting photographic print means for the projection surface;

exposing the photographic print means thus producing a print wherein the small detail contrast is enhanced and the larger areas appear with greatly subdued contrast.

4. A method for contrast enhancement of small details on a photographic negatives as in claim 3 wherein projecting the second image through the positive transparency is accomplished by placing the positive transparency directly upon the photographic print paper and exactly alining the positive transparency with a projected image of identical size.

5. A method for contrast enhancement of small details on a photographic negative as in claim 3 wherein projecting the second image through the positive transparency is accomplished by placing a positive transparency of identical size to the negative directly upon the negative and alining the positive transparency and photographic negative whereby they match exactly.

6. The method of claim 1 wherein said linear radial transmission filter is inserted inside said lens at the stop of said lens.

* * * * *